United States Patent
Pfeuffer

(10) Patent No.: US 12,253,231 B2
(45) Date of Patent: Mar. 18, 2025

(54) HEADLAMP DEVICE FOR A TILTING VEHICLE HAVING A HOUSING AND A COVER UNIT COMPRISING AN OPTICAL ELEMENT AND AN OPAQUE SHIELDING UNIT

(71) Applicant: Bayerische Motoren Werke Aktiengesellschaft, Munich (DE)

(72) Inventor: Frederic Pfeuffer, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/565,140

(22) PCT Filed: Jun. 8, 2022

(86) PCT No.: PCT/EP2022/065553
§ 371 (c)(1),
(2) Date: Nov. 29, 2023

(87) PCT Pub. No.: WO2023/280502
PCT Pub. Date: Jan. 12, 2023

(65) Prior Publication Data
US 2024/0280235 A1  Aug. 22, 2024

(30) Foreign Application Priority Data
Jul. 9, 2021 (DE) ..................... 10 2021 117 738.3

(51) Int. Cl.
*F21S 41/47* (2018.01)
*F21S 41/20* (2018.01)
*B62J 6/026* (2020.01)

(52) U.S. Cl.
CPC .......... *F21S 41/47* (2018.01); *F21S 41/2805* (2024.05); *F21S 41/285* (2018.01); *B62J 6/026* (2020.02)

(58) Field of Classification Search
CPC .................................................. F21S 41/2805
See application file for complete search history.

(56) References Cited

U.S. PATENT DOCUMENTS

| 5,546,284 A | 8/1996 | Harada |
| 9,970,618 B2 * | 5/2018 | Zawacki ................. F21S 41/28 |

(Continued)

FOREIGN PATENT DOCUMENTS

| DE | 38 43 522 A1 | 7/1990 |
| DE | 10 2004 018 876 A1 | 3/2005 |

(Continued)

OTHER PUBLICATIONS

International Search Report (PCT/ISA/210) issued in PCT Application No. PCT/EP2022/065553 dated Sep. 2, 2022 with English translation (6 pages).

(Continued)

*Primary Examiner* — Robert J May
(74) *Attorney, Agent, or Firm* — Crowell & Moring LLP

(57) ABSTRACT

A headlamp device for a tilting vehicle includes an optical housing which has a cavity that is accessible from the outside via an opening; an illuminant which is located in the cavity of the optical housing and through which electromagnetic waves can be emitted in the visible and/or invisible range; a cover unit which can be fixed or is fixed to the optical housing so as to overlay the opening of the optical housing, in particular in its entirety, in order to outwardly delimit the cavity together with the optical housing. The cover unit includes a transparent and/or translucent optical element which is optically downstream of the illuminant and which is optically transparent to the electromagnetic waves of the illuminant; an opaque cover element which is optically opaque to the electromagnetic waves of the illuminant;

(Continued)

and a common single-piece component formed by the optical element and the cover element.

11 Claims, 2 Drawing Sheets

(56) References Cited

U.S. PATENT DOCUMENTS

| | | |
|---|---|---|
| 2005/0003159 A1 | 1/2005 | Ikeda et al. |
| 2019/0154223 A1 | 5/2019 | Mizutani et al. |
| 2021/0190285 A1 | 6/2021 | Demontoux et al. |

FOREIGN PATENT DOCUMENTS

| | | |
|---|---|---|
| DE | 10 2011 119 379 A1 | 5/2013 |
| DE | 10 2013 012 227 A1 | 3/2014 |
| DE | 10 2012 024 625 A1 | 6/2014 |
| DE | 10 2019 218 671 A1 | 6/2021 |
| EP | 2 650 098 A1 | 10/2013 |
| EP | 3 000 656 A1 | 3/2016 |
| FR | 2 765 665 A1 | 1/1999 |
| JP | 2005-82036 A | 3/2005 |
| JP | 2017-30262 A | 2/2017 |
| WO | WO 2015/001823 A1 | 1/2015 |

OTHER PUBLICATIONS

German-language Written Opinion (PST/ISA/237) issued in PCT Application No. PCT/EP2022/065553 dated Sep. 2, 2022 with English translation (8 pages).

German-language Search Report issued in German Application No. 10 2021 117 738.3 dated Feb. 15, 2022 with partial English translation (11 pages).

* cited by examiner

HEADLAMP DEVICE FOR A TILTING VEHICLE HAVING A HOUSING AND A COVER UNIT COMPRISING AN OPTICAL ELEMENT AND AN OPAQUE SHIELDING UNIT

BACKGROUND AND SUMMARY

The invention relates to a headlamp device for a tilting vehicle and to a tilting vehicle comprising such a headlamp device.

Headlamp devices for tilting vehicles are known in various embodiments from the prior art. Here, light is emitted by at least one light-emitting device to light for example the road section situated in front of the tilting vehicle. The light-emitting device is entirely enclosed, on one side by a transparent and/or translucent diffusing lens, through which the light from the light-emitting device can pass to the outside, and on the other side by an optics housing.

In the known headlamp devices, a reflector is arranged in the optics housing on the surface facing the light-emitting device or is designed as a surface section of the optics housing. The reflector leads to the light emitted by the light-emitting device being scattered into a plurality of directions. This may lead to undesirable dazzling of further road users or of the user of the tilting vehicle.

In order to prevent undesirable scattering of light emerging from the light-emitting device, it is known to form a shielding element by adhesively bonding thereto an opaque film or by varnishing it with an opaque colorant. Since the diffusing lens may have a complex geometry, the application of the shielding element in the known headlamp devices is complicated. High requirements in terms of esthetics and optical effect lead to an increased installation effort and to a high level of rejected components.

It is an object of an exemplary embodiment of the invention to propose a headlamp device in which stray-light incidence is easily reducible.

This object is achieved by a headlamp device for a tilting vehicle having at least one optics housing which comprises at least one cavity that is accessible from the outside via an opening, having at least one light-emitting device that is arranged in the cavity of the optics housing and through which electromagnetic waves in the visible and/or invisible range are emittable, having at least one cover unit which is securable or secured to the optics housing, with the opening in the optics housing being overlaid in particular in its entirety, in order to bound the cavity together with the optics housing toward the outside, which comprises at least one transparent and/or translucent optical element that is optically connected downstream of the light-emitting device and is optically transmissive to the electromagnetic waves from the light-emitting device, and which comprises at least one opaque shielding element, which is optically opaque to the electromagnetic waves of the light-emitting device, characterized in that the cover unit comprises a common one-piece component formed from the optical element and the shielding element.

Since the cover unit comprises a common one-piece component formed from the optical element and the shielding element, the shielding element can be arranged on the optical element better with respect to the arrangement, orientation and extent. Thereby, clear edges can be easily formed, as a result of which undesirable scatter effects are reducible in a simplified manner. Moreover, a downstream processing step for producing the cover unit, specifically the adhesive bonding or varnishing of the shielding element, is dispensable.

Since the cover unit overlays the opening in the optics housing, in particular in its entirety, the light-emitting device is shieldable in its entirety with respect to environmental influences. Consequently, the life of the headlamp device is increased and the risk of moisture and dirt penetrating it is reduced.

The electromagnetic waves emitted by the light-emitting device may comprise light in the visible range and/or infrared radiation. The latter can functionally support a sensor system of the tilting vehicle.

A tilting vehicle is understood to mean bicycles, motorcycles or motorcycle-type motor vehicles, such as motorized bikes, in particular with two, three or four wheels, scooters, tilting trikes, quads or the like.

The cover unit can be produced easily and cost-effectively if the cover unit comprises a multi-component injection-molded part, in particular if the optical element comprises a transparent and/or translucent plastic and if the shielding element comprises an opaque plastic.

Since the cover unit comprises a multi-component injection-molded part, the optical element and the shielding element can be optimally oriented in relation to each other as part of an injection molding process directly during the production process, i.e., when the plastic is injected into the injection molds, and can produce high-quality edges. As a result, the optical effect and accuracy of the headlamp device is improved.

The transparent and/or translucent plastic and/or the opaque plastic can comprise, for example, a polycarbonate (PC).

In principle, it is conceivable that the cover unit comprises merely a plate which extends substantially flat in a plane. In embodiments of the headlamp device, however, it is preferred if the cover unit, in particular the transparent and/or translucent optical element, comprises a free-form optical unit.

When forming the cover unit as a free-form optical unit, the optical effect of the transparent and/or translucent optical element can be improved further, and an optically pleasing exterior can be created. Furthermore, the headlamp device can be improved in terms of aerodynamics.

For example, the optical element can comprise, in its entirety or in part, a light exit window through which electromagnetic waves from the light-emitting device can pass substantially unhindered and without refraction. Moreover, it is conceivable for the optical element in its entirety or in part to act in the manner of a lens, a prism or a reflector, as a result of which deflection of the electromagnetic waves from the light-emitting device is made possible.

In one embodiment of the headlamp device, provision is made for the transparent and/or translucent optical element to overlay the opening in the optics housing in its entirety and for the shielding element to be secured in part to the optical element so as to form at least one viewing window.

If the transparent and/or translucent optical element overlays the opening in the optics housing in its entirety, it is possible, when the cover element is in the position in which it is arranged at the optics housing, that the cavity in its entirety is enclosed by the optical element. In that case, the transparent and/or translucent optical element can form the carrying structure of the cover unit. Since the shielding element is secured in part to the optical element so as to form at least one viewing window, it can be ensured that light leaves the light-emitting device through the cover unit.

In a development of the last-mentioned embodiment, it is advantageous if the shielding element is arranged at least at a peripheral section of the optical element facing the optics housing in a manner such that it surrounds the peripheral section in part or in its entirety.

In this way, scatter effects in the direction of the vehicle driver can be easily prevented.

Embodiments of the headlamp device in which the shielding element is arranged on the side facing the light-emitting device or in which the shielding element is arranged on the side of the optical element facing away from the light-emitting device are also conceivable. If the shielding element is arranged on the side of the optical element facing the light-emitting device, it is possible to reduce any scattering or deflections of the electromagnetic waves that may occur owing to the passage through the optical element. If the shielding element is arranged on the side of the optical element facing away from the light-emitting device, the shielding element is better protected against overheating due to the light-emitting device.

In particular if the shielding element is arranged at a peripheral section of the optical element facing the optics housing such that it surrounds it entirely, it is advantageous if the cover unit is secured or securable to the optics housing such that the shielding element rests against the optics housing.

In that case, the optical element can comprise a rigid plastic whose optical properties are improved and which is merely plastically deformable. The shielding element can comprise an elastic plastic and, due to its resting against the optics housing, can manifest a sealing action between the cover unit and the optics housing that is inherent to the plastic.

In order to influence optical effects even before the incidence of the electromagnetic waves emitted by the light-emitting device on the cover unit, it is possible in one embodiment of the headlamp device to provide at least one additional shield, which is formed as a separate or separable component and is securable or secured, contactlessly at a distance from the optical element, to the shielding element of the cover unit so as to be detachable or non-detachable.

Since the at least one additional shield is securable or secured contactlessly at a distance from the optical element, the additional shield can be arranged in the direct vicinity of the light-emitting device. The additional shield can overlay the cover unit in the manner of a mask while leaving one or more light windows exposed.

In order to easily arrange the at least one additional shield in the cavity and to position and orient the additional shield in relation to the cover unit, it proves advantageous in a development of the last-mentioned embodiment if the shielding element of the cover unit comprises on the side facing the additional shield at least one receptacle in which the additional shield is arrangeable with a joining section and is orientable in relation to the cover unit.

The technical action of the headlamp device can be improved further if the optics housing comprises at least one reflector element that comprises a section of the optics housing and forms a common component with the optics housing and/or comprises a component that is separate or separable from the optics housing and is secured to the optics housing so as to be detachable or non-detachable.

Moreover, embodiments of the headlamp device are conceivable in which at least one region of the optical element of the cover unit and/or the shielding element of the cover unit forms a reflector element. It is furthermore conceivable that regions of the additional shield are formed as a reflector element.

Finally, the object is achieved by a tilting vehicle having a headlamp device with at least one of the previously mentioned features.

Further features, details and advantages of the invention are evident from the attached patent claims, from the figures and the following description of a preferred embodiment of the headlamp device.

DETAILED DESCRIPTION OF THE DRAWINGS

Figure 1:
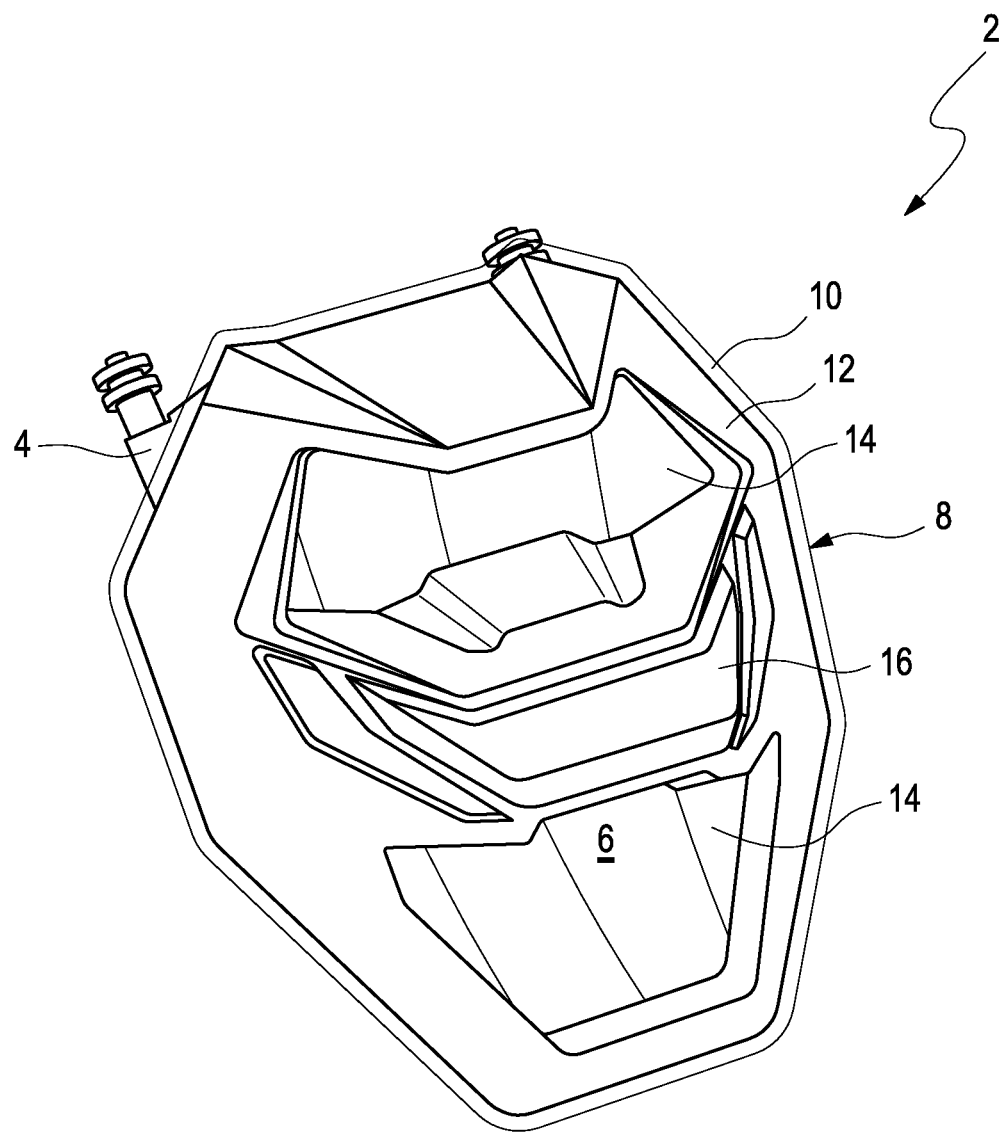
FIG. 1 shows a perspective front view of an exemplary embodiment of the headlamp device.
Figure 2:
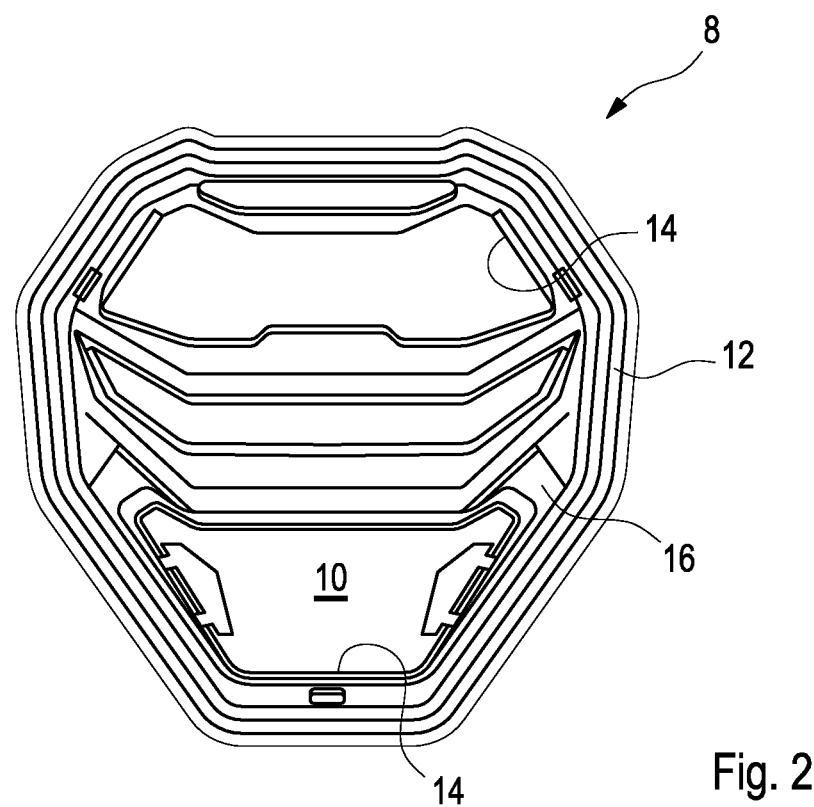
FIG. 2 shows a rear view of the headlamp device according to FIG. 1.
Figure 3:
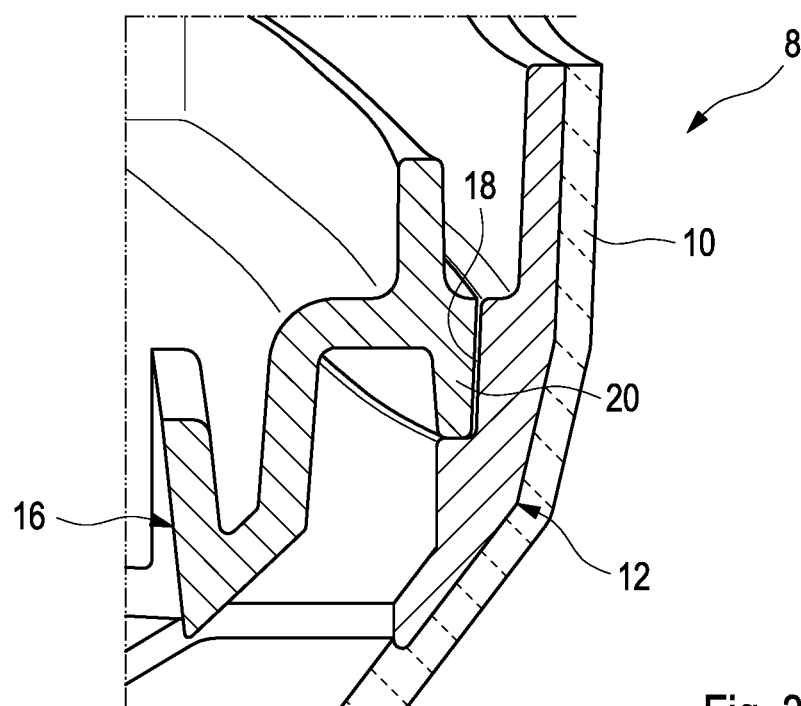
FIG. 3 shows a detailed view of an arrangement of an additional shield at a shielding element of the cover unit.

The figures show an exemplary embodiment of a headlamp device, provided in its entirety with the reference sign 2, for a tilting vehicle (not shown in the figures). The headlamp device 2 comprises at least one optics housing 4, which comprises at least one cavity 6 which is accessible from the outside via an opening. Arranged in the cavity 6 of the optics housing 4 is a light-emitting device (not shown in the figures). The light-emitting device can emit electromagnetic waves in the visible and/or invisible range, in particular light or infrared radiation.

Moreover, the headlamp device 2 comprises a cover unit 8, which is secured to the optics housing 4, with the opening in the optics housing being overlaid in its entirety. Together with the optics housing 4, the cover unit 8 bounds the cavity 6 in its entirety toward the outside.

The cover unit 8 comprises a transparent and/or translucent optical element 10, which, in the exemplary embodiment shown in the figures, overlays the opening in the optics housing 4 in its entirety. The optical element 10 is optically connected downstream of the light-emitting device and is optically transmissive to electromagnetic waves from the light-emitting device.

Moreover, the cover unit 8 comprises an opaque shielding element 12, which is optically opaque to the electromagnetic waves from the light-emitting device. In the exemplary embodiment shown in the figures, the shielding element 12 is arranged at a peripheral section facing the optics housing, overlays part of the optical element 10, and forms two viewing windows 14. In the exemplary embodiment shown in the figures for the headlamp device 2, the cover unit 8 is formed by a common one-piece component formed from the optical element 10 and the shielding element 12. The optical element 10 and the shielding element 12 here comprise a plurality of plastics components, which form the cover unit 8 during a multi-component injection molding process.

The figures show an exemplary embodiment of the headlamp device 2, in which an additional shield 16 is provided, which is arranged in the cavity 6 and is formed as a separate or separable component. The additional shield 16 is secured to the shield element 12 of the cover unit 8 and is contactlessly at a distance from the optical element 10.

In order to secure the additional shield 16 to the shielding element 12, the shielding element 12 comprises a receptacle 18 in which the additional shield 16 is arrangeable with a joining section 20 and orientable in relation to the cover unit 8.

The features of the invention that are disclosed in the previous description, in the claims and in the drawing can be essential, both individually and also in any desired combination, in the implementation of the invention in its various embodiments.

LIST OF REFERENCE SIGNS

2 Headlamp device
4 Optics housing
6 Cavity
8 Cover unit
10 Optical element
12 Shielding element
14 Viewing window
16 Additional shield
18 Receptacle
20 Joining section.

What is claimed is:

1. A headlamp device for a tilting vehicle, the headlamp device comprising:
   an optics housing which comprises a cavity that is accessible from outside via an opening,
   a light-emitting device that is arranged in the cavity of the optics housing and through which electromagnetic waves in a visible and/or an invisible range are emittable,
   a cover unit which is securable or secured to the optics housing, with the opening in the optics housing being overlaid in order to bound the cavity together with the optics housing toward the outside,
   wherein the cover unit comprises:
      a transparent and/or translucent optical element that is optically connected downstream of the light-emitting device and is optically transmissive to the electromagnetic waves from the light-emitting device,
      an opaque shielding element which is optically opaque to the electromagnetic waves of the light-emitting device, and
      a common one-piece component formed from the optical element and the shielding element, and
   wherein the headlamp device further comprises an additional shield, which is arranged in the cavity, is formed as a separate or separable component, and is securable or secured, contactlessly at a distance from the optical element, to the shielding element of the cover unit.

2. The headlamp device according to claim 1, wherein the cover unit comprises a multi-component injection-molded part.

3. The headlamp device according to claim 2, wherein the optical element comprises a transparent and/or translucent plastic and the shielding element comprises an opaque plastic.

4. The headlamp device according to claim 1, wherein the cover unit comprises a free-form optical unit.

5. The headlamp device according to claim 1, wherein the transparent and/or translucent optical element comprises a free-form optical unit.

6. The headlamp device according to claim 1, wherein:
   the transparent and/or translucent optical element overlays opening in the optics housing in its entirety, and
   the shielding element is secured in part to the optical element to form at least one viewing window.

7. The headlamp device according to claim 6, wherein the shielding element is arranged at least at a peripheral section of the optical element facing the optics housing such that the shielding element surrounds the peripheral section in part or in its entirety.

8. The headlamp device according to claim 1, wherein the shielding element is arranged on a side facing the light-emitting device or on a side of the optical element facing away from the light-emitting device.

9. The headlamp device according to claim 1, wherein the cover unit is securable or secured to the optics housing such that the shielding element rests against the optics housing.

10. The headlamp device according to claim 1, wherein the shielding element of the cover unit comprises, on a side facing the additional shield, a receptacle in which the additional shield is arrangeable with a joining section and is orientable in relation to the cover unit.

11. A tilting vehicle comprising the headlamp device according claim 1.

* * * * *